March 6, 1945. R. R. WEDDELL 2,371,089
CUTTER MOUNTING
Filed Sept. 25, 1944
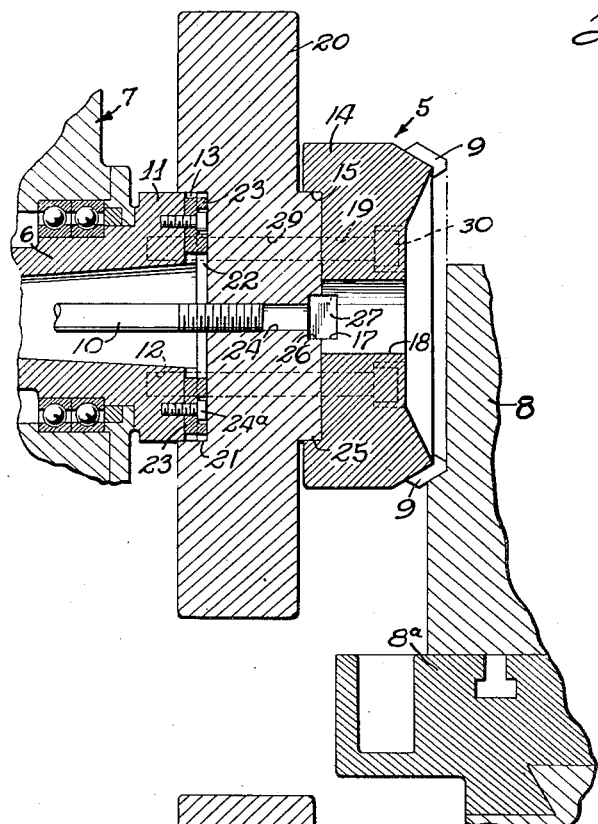
Fig. 1
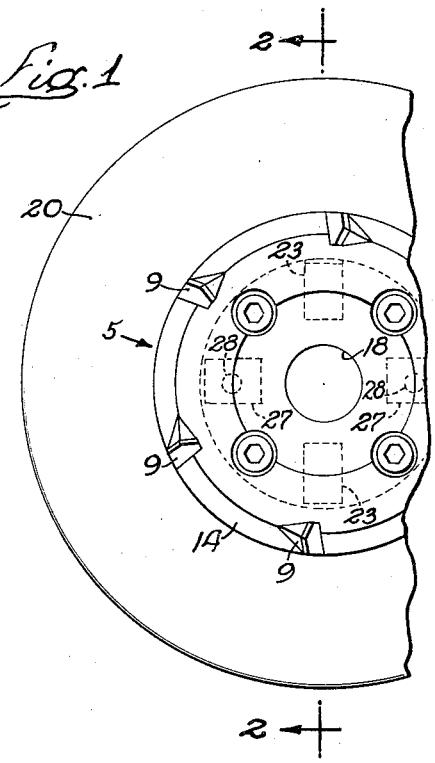
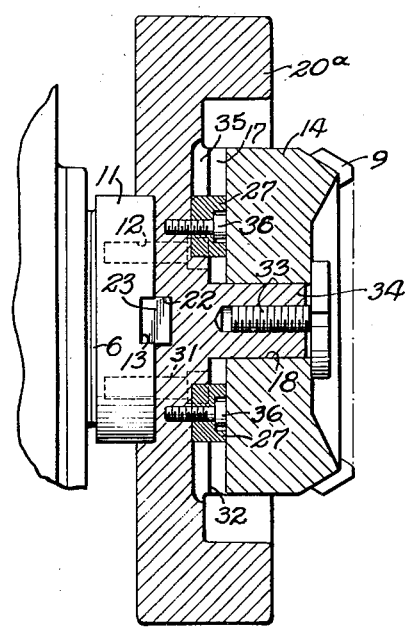
Fig. 3
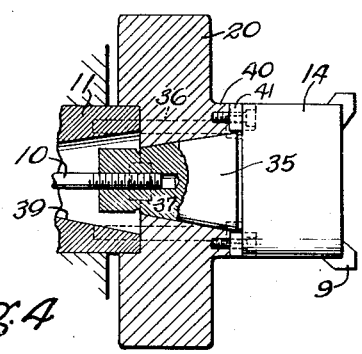
Fig. 4
INVENTOR
Ralph R. Weddell
By Carlson, Pitzner, Hubbard, Wolfe
ATTORNEYS Patented Mar. 6, 1945

2,371,089

UNITED STATES PATENT OFFICE 2,371,089

CUTTER MOUNTING

Ralph R. Weddell, Rochester, N. Y.

Application September 25, 1944, Serial No. 555,601

7 Claims. (Cl. 90—11)

This invention relates to the mounting and driving of rotary milling cutters, and the primary object is to provide a drive which enables smooth cutting action to be obtained and minimizes vibration of the cutter, and this, in spite of the existence of conditions such as wide spacing of the cutter teeth that are conducive to vibration.

A more detailed object is to provide for coupling of the cutter to the drive arbor or spindle of a milling machine through the intermediary of a flywheel capable of storing sufficient energy to avoid wind-up in the drive connection to the cutter incident to engagement of the successive cutter teeth with the work.

The invention also resides in the novel structural arrangement of the flywheel mounting surfaces.

Other objects and advantages of the invention will become apparent from the following detailed description taken in connection with the accompanying drawing, in which Figure 1 is a fragmentary face view of a milling cutter and its mounting embodying the present invention.

Fig. 2 is a sectional view taken along the line 2—2 of Fig. 1 also showing the adjacent parts of the milling machine and the work being operated upon.

Figs. 3 and 4 are diametrical sectional views of modifications.

In the drawing, the invention is illustrated as applied to the mounting of a face milling cutter 5 on the spindle 6 of a milling machine 7, the spindle in this case being disposed horizontally for operation of the cutter on a workpiece 8 supported on a table 8a. The cutter shown in Figs. 1 and 2 has an annular row of widely spaced teeth 9 while the fly cutter shown in Fig. 3 has only two teeth. In accordance with standard practice, the spindle is made hollow for extension of a tie rod 10 therethrough and the accurately machined flanged end 11 has formed in its end face an annular row of screw holes 12 and a dimetrical keyway 13. The body 14 of the cutter is adapted for mounting directly on the spindle end 11, and for this purpose has a counterbore 15 adapted to fit over the spindle end 11 and against the end face thereof. The cutter body also has diametrically extending keyways 17 disposed on opposite sides of a central bore 18 and counterbored screw holes 19 adapted to match with the spindle holes 12.

In accordance with the present invention, provision is made for connecting the cutter body 14 to the spindle 6 through the intermediary of a flywheel 20 of a diameter substantially larger than the cutter so as to enable the desired mass to be obtained without objectionable overhang of the cutter relative to the spindle. For this purpose, the flywheel is contoured on one side to mate with the spindle end 11, having for this purpose a counterbore 21 and keyways 22 for receiving keys 23. In the form shown in Figs. 1 and 2, the tie rod 10 threading into a center hole 24 clamps the flywheel against the spindle end. The keys 23 which are secured in the spindle ways 13 by screws 24a project into the matching ways 13 and 22 and provide a positive driving connection between the two.

To positively connect the flywheel and cutter, a hub 25 formed on the other side of the flywheel is adapted to fit closely in the counterbore 15 of the cutter body. A diametrical keyway 26 extends across the hub face and keys 27 are secured in this way by screws 28 threading into the flywheel. The keyway 26 is of the same width and radial location as the keyways 13 on the spindle nose so that the cutter may, if desired, be mounted directly on the spindle nose. The keys 27 project beyond the face of the hub and are adapted to fit into the ways 17 on the back of the cutter body. Tapped holes 29 matching the holes 19 in the cutter body are formed around the hub 25 and are adapted to receive cap screws 30 projecting through the body 14 and, if desired, into the tapped spindle holes 12.

In the form shown in Fig. 3, a somewhat closer spacing of the cutter and spindle end is achieved by constructing the flywheel with a flange 20a which projects forwardly over part of the cutter body. In this case, the flywheel is clamped against the spindle end by screws 31 projecting through counterbored holes extending through the flywheel. The cutter is clamped against the face 32 of the flywheel by a screw 33 which threads into the end of a small hub 34 on the flywheel fitting closely in the central bore 18 of the cutter body. The hub 34 may, of course, be made as a separate plug or centering arbor formed at its rear end with a taper fitting into the spindle socket and held therein by the tie rod 10. The keys 27, which provide the positive connection with the flywheel, are secured in the flywheel ways by screws 36 in this instance seated in ways 35 cut in the face of the flywheel externally of the hub.

Fig. 4 shows a modified construction of the flywheel adapted for use with other types of cutters including one having a tapered shank 36 integral with the cutter body 14. In this case the flywheel is counterbored on one side to receive the spindle nose and is secured to the spindle by screws 36 and a key 37. The center hole 38 of the cutter is tapered to match the spindle taper 39 and to receive the tapered cutter shank 35 into which the tie bolt 10 threads. Positive drive between the flywheel and cutter is obtained by keys 41 disposed in matching keyways on the back of the cutter and the face of the flywheel hub 40.

In the different forms described above, the flywheel is disposed immediately adjacent the cutter and the two are connected rigidly with a positive key drive between them. No part of the spindle 6 or any other part which possesses resiliency is interposed in the drive connection so that the possibility of wind up under the shock incident to engagement of a cutter tooth with the workpiece is eliminated. Accordingly, the energy stored in a flywheel is immediately available to force the successive cutter teeth into the work thereby producing a smooth cutting action and avoiding vibration. The flywheel 20 is, of course, correlated in size with the cutting burden to be overcome, and preferably is ample to accommodate several different sizes of cutters. It has been found that a wheel 12 inches in diameter and 2¾ inches thick will produce the desired action when used in medium duty work with cutters three to six inches in diameter on knee type milling machines. With larger cutters correspondingly larger flywheels would be used.

I claim as my invention:

1. For mounting on the spindle end of a machine tool having a diametrical keyway, a flywheel counterbored on one side to fit over said spindle end and having a keyway to match the spindle keyway, an axially projecting hub on the opposite side of said flywheel and having a radially disposed keyway on its end face of the same width as said first mentioned keyway, and means by which the flywheel may be clamped between a spindle end and a cutter.

2. For mounting on the conventionally contoured spindle end of a machine tool, a flywheel counterbored on one side to fit over said spindle end and having a diametrical keyway, an axially projecting hub on the opposite side of said flywheel and adapted to project into the central recess of a milling cutter to support the latter, a radial keyway formed in the latter side of said flywheel externally of said hub, and means formed on the flywheel by which the wheel may be clamped rigidly between a spindle end and a cutter.

3. For use with a cutter and a spindle end each having a diametrical keyway, a flywheel having a diametrical keyway on one side and contoured on such side to interfit with said spindle end with the keyway matching the spindle keyway, a second keyway on the opposite side of the flywheel, a contour on the latter side adapted to interfit with said cutter with the second keyway matching the cutter keyway, and means on the flywheel for engaging complemental parts on said spindle and cutter for clamping the three together axially.

4. For use with a cutter and a milling machine spindle, a flywheel contoured on one side to interfit in centered keyed relation with the end of said spindle, a contour on the opposite side of the flywheel adapted to interfit in keyed relation with said cutter, and means formed in said flywheel by which the latter may be axially clamped to said spindle end and also to said cutter.

5. For use with a cutter and a milling machine spindle centrally formed with complemental contours adapted to interfit and form a driving key connection, a flywheel contoured on one side to complement and interfit with the contour on said spindle end and on the other side to interfit with the contour on said cutter, and means by which said opposite sides of said flywheel may be clamped to said spindle end and cutter respectively.

6. The combination of a flywheel centrally contoured on one side to fit onto the end of a cutter spindle of a machine tool, a cutter, complemental contours on said cutter and the other side of said flywheel interfitting to provide a rigid keyed connection between the spindle for transmitting driving power from the flywheel directly to the cutter, and means by which said cutter and flywheel may be clamped together.

7. The combination of a flywheel centrally counterbored on one side to fit over the end of a cutter spindle of a machine tool, a hub projecting from the opposite side of said flywheel, a cutter centrally recessed to fit on said hub, and means providing a positive driving connection between said cutter and said flywheel.

RALPH R. WEDDELL.